Patented Dec. 23, 1924.

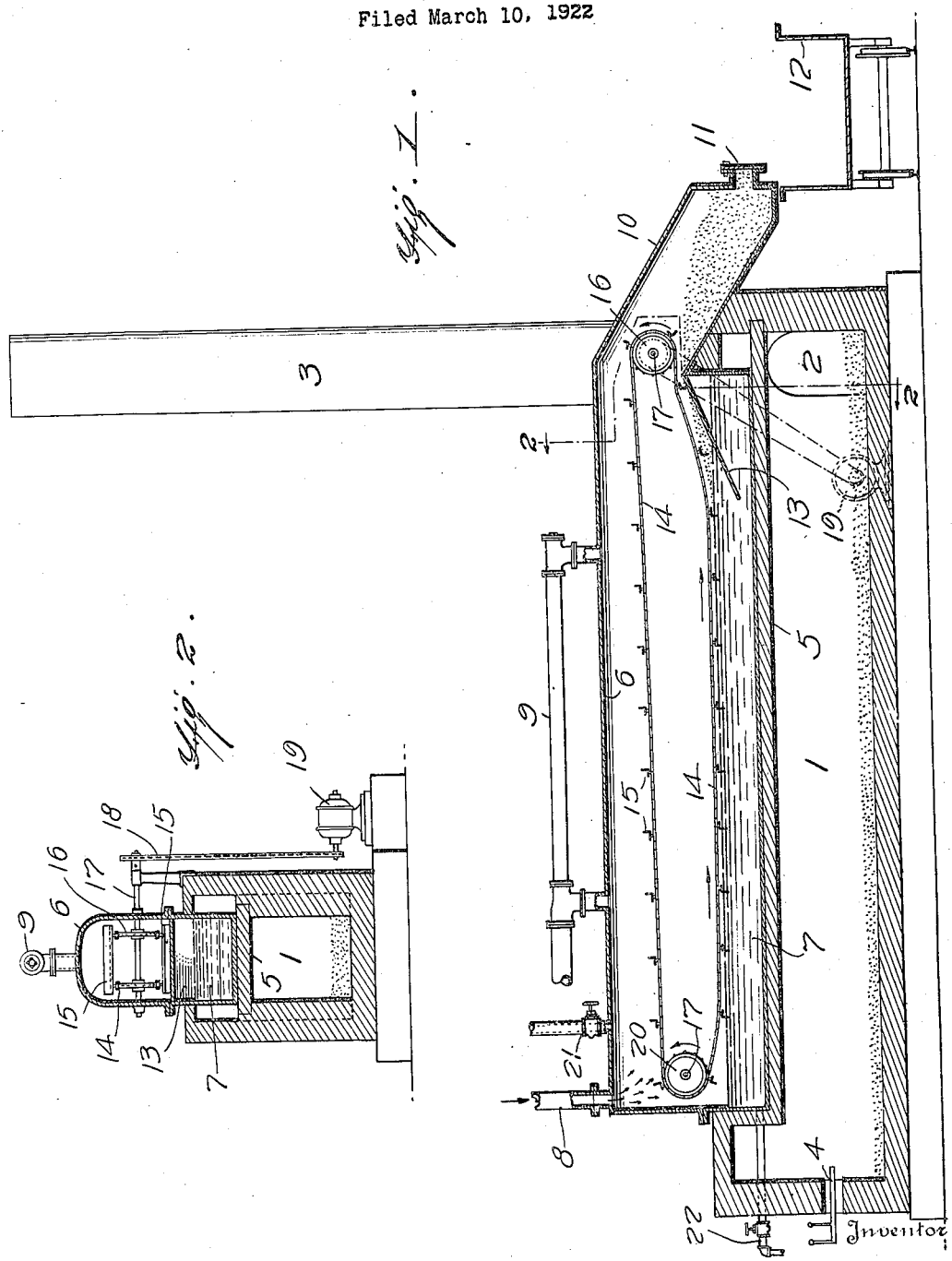

1,520,080

UNITED STATES PATENT OFFICE.

GEORGE L. PRICHARD AND HERBERT HENDERSON, OF PORT ARTHUR, TEXAS, ASSIGNORS TO GULF REFINING COMPANY, OF PITTSBURGH, PENNSYLVANIA, A CORPORATION OF TEXAS.

RECOVERING ALUMINUM CHLORIDE.

Application filed March 10, 1922. Serial No. 542,537.

*To all whom it may concern:*

Be it known that we, GEORGE L. PRICHARD and HERBERT HENDERSON, citizens of the United States, and residents of Port Arthur, in the county of Jefferson and State of Texas, have invented certain new and useful Improvements in Recovering Aluminum Chloride, of which the following is a specification.

This invention relates to recovering aluminum chloride; and it comprises a method of recovering aluminum chloride from oily sludges containing the same wherein such a sludge is heated on the surface of a bath of lead or fusible metal at constant temperature and the expelled vapors of chloride removed and condensed; all as more fully hereinafter set forth and as claimed.

In various processes of purifying and of converting petroleum oils, such an oil is heated or distilled in the presence of anhydrous aluminum chloride. Aluminum chloride has only a limited solubility in warm or hot oils and when a small amount, say 5 per cent, is added to a body of hot oil it melts down or combines with a portion of the oil to form a heavy oily liquid. In practice this heavy liquid is kept stirred up through the rest of the oil by energetic agitation. As the catalysis goes on this oily liquid becomes of thicker consistency and of lower catalytic activity. In it the aluminum chloride is apparently still present but it no longer presents the same activity as the fresh material. It is therefore the custom to remove the "sludge" after a time and send it to recovery plants to recover the chloride in an active state. This is done by heating.

In heating the chloride sludge there is a liberation of oils in the vapor form and finally of vapors of aluminum chloride. These vapors may be condensed together or separately. The residue is a dry coke. The recovery by heat while simple enough in principle is somewhat difficult in practice. It is desirable to raise the temperature of the sludge rather gradually and quite uniformly, avoiding any overheating. Since however the sludgy material is a poor conductor of heat and penetration of heat is moreover resisted by the strongly endothermic (heat-absorbing) volatilizing actions, it is difficult to heat any large amount of the sludge without local overheating somewhere. And since rapid volatilization, whether of oil or of chloride, requires ample expansion room for the vapors, it is difficult in any event to secure efficient work in tubular heaters charged with sludge.

In the present invention we obviate the noted difficulties and secure certain advantages by heating the sludge as a comparatively thin layer on the surface of a bath of molten lead or fusible metal, kept at constant temperature and in a chamber offering ample vapor room. The particular character of the sludge depends somewhat on the stage at which it is withdrawn from the oil converting operation; but it is usually of tarry or asphaltic nature, liquefying or at least becoming much thinner at high heats and tends to spread out over the surface of the liquid lead, with which it is immiscible, as a thin layer, giving on the one hand an ample heat receiving area and on the other an ample surface for extrication of vapors. As this extrication goes on the sludge loses its liquidity or thinness. In the best mode of applying our invention at present known to us, we therefore establish and maintain a relatively long and narrow bath of lead at constant temperature to prevent overheating of the sludge and supply the sludge to one end, withdrawing stripped residues at the other and facilitating movement of the sludge by a conveyor sweeping the surface of the lead. Small portions of sludge supplied at the feed end, spread out and lose both their oil and their chloride by volatilization, become thicker and are moved forward by the conveyor. Volatilization can be quickened by the use of suction or by a streaming current of indifferent gases or of oil vapors. If gases be used however they must be dry, that is, free of water vapor.

In the accompanying drawings we have shown one form of apparatus capable of performing our process.

Fig. 1. is a vertical longitudinal section partly in elevation;

Fig. 2 is a vertical section along line 2—2 of Fig. 1.

The furnace chamber 1 of fire brick or the like is provided with the flue 2 and the stack 3 at one end and the burner 4 at the other end. Mounted immediately above the roof 5 of the furnace is the cast iron or steel pan 6 containing a body of normally molten lead 7 and having the inlet 8 for admission of the aluminum chloride residue and the vapor outlets 9 leading to a condenser for condensing the vapors of aluminum chloride produced from the residue. Pyrometers or the like may be used in the lead bath for observation of temperature. The lead receptacle 6 is provided with the outlet chute 10 having the opening 11 leading to car 12 for collection of residual coke or nonvolatilized matter. Inside, the receptacle is provided with the apron 13 normally extending below the level of the molten lead therein for the purpose of directing and leading the matter at this end of the receptacle to the chute 10 and this apron is of a sufficient length to permit the lead to run back into the bath. The receptacle is further provided inside with a chain 14 carrying a series of conveying arms, scrapers or drags 15, the chain being driven by sprocket 16, mounted on shaft 17 extending outside of the receptacle. The shaft may be driven by the sprocket and chain mechanism 18 and motor 19. At the other end the chain rides over idle sprocket 20 mounted on shaft 17. The lead bath may be withdrawn through the valved outlet 22. If the process is run on batches, the temperature of the bath may be gradually raised after the residue is supplied and the vapors of hydrocarbons initially expelled may be collected by valved line 21 in communication with a condenser (not shown), vapor outlet 9 being closed.

In operation the aluminum chloride residue is fed into the inlet 8 and is carried over the top of the lead bath 7 by means of the conveyor mechanism described, the residue floating on top of the bath. The bath is advantageously maintained at temperatures around 800° to 1000° F. depending upon the nature of the aluminum chloride residue, and the volatilized aluminum chloride passes through vapor outlet 9 to the condenser (not shown). Toward the end of the bath the non-volatilized products (coke and the like) are collected by the apron 13 and the chain conveyor and are sent to the chute 10 from which they are removed into the car 12. Should small amounts of lead be removed with the coke, the coke and lead may be separated or the mixture may be introduced again into the receptacle 6.

What we claim is:—

1. In the recovery of aluminum chloride from sludges containing the same, the process which comprises heating such sludge as a thin layer on the surface of a hot liquid immiscible therewith.

2. In the recovery of aluminum chloride from sludges containing the same, the process which comprises heating such sludge as a thin layer on the surface of a bath of molten lead.

3. In the recovery of aluminum chloride from sludges containing the same, the process which comprises establishing and maintaining a bath of molten lead at a temperature sufficient to volatilize aluminum chloride, supplying sludge at one point on the surface of said bath and removing stripped residues at another point.

4. In the recovery of aluminum chloride from sludges containing the same, the process which comprises establishing and maintaining an elongated bath of molten lead at a temperature sufficient to volatilize aluminum chloride, supplying sludge to one end of the bath, moving the sludge forward along the surface of said bath and finally removing stripped sludge at the other end.

Signed at Port Arthur, Texas, this 6th day of March, 1922.

GEORGE L. PRICHARD.
HERBERT HENDERSON.